3,412,115
POLYAMIDE RESIN
Don E. Floyd, Robbinsdale, and David W. Glaser, St. Paul, Minn., assignors to General Mills, Inc., a corporation of Delaware
No Drawing. Filed Nov. 2, 1964, Ser. No. 408,364
11 Claims. (Cl. 260—404.5)

ABSTRACT OF THE DISCLOSURE

There is disclosed polyamides of a polymeric fat acid, an alkylene diamine and a hexanoic acid and solutions thereof. Alcoholic solutions of the polyamides are useful as flexographic ink vehicles.

---

This invention relates to polyamide resins and solutions thereof suitable as flexographic ink vehicles and in particular to polyamides obtained by reacting a mixture of polymeric fat acids, an alkylene diamine and a substituted or unsubstituted hexanoic acid.

Flexographic inks are solvent based inks applied by rollers or pads to flexible sheets of plastic foil or paper. Resinous binders have been employed in such inks including the polyamide resins of polymeric fat acids. However in general, such resinous binders possessed low crinkle resistance. It has now been found that the inclusion of hexanoic acid or alkyl substituted derivatives thereof such as 2-ethyl hexoic acid, unexpectedly improves the crinkle resistance.

It is therefore an object of this invention to provide a polyamide resin suitable for use as a flexographic ink binder, and possessing high crinkle resistance.

It is also an object of this invention to provide a flexographic ink vehicle having such polyamide binder.

The ideal solvents for a flexographic ink are isopropanol or denatured ethyl alcohol. Most of the compositions of the present invention exhibit excellent solubility in isopropanol. Certain of the higher melting point compositions are slightly less soluble in isopropanol; however, for most purposes their solubility is adequate. In addition, small amounts of other solvents such as normal propanol, heptane, or aliphatic hydrocarbon mixtures yield ink binder solutions of satisfactory characteristics.

The polyamides of the present invention are prepared by reacting principally polymeric fat acids, an alkylene diamine, and a hexanoic acid. Reaction conditions for the preparation of the polyamide resins may be varied widely. Generally the reaction is carried out at a temperature within the range of 150–250° C. Preferably the reaction is carried out at about 225° C. The time of reaction may also be varied widely and will depend somewhat on temperature. Normally a time period of 3 to 8 hours after reaching the selected temperature is required. The preferred time of reaction is about 5 hours. A typically set of reaction conditions is 225° C. for a period of 5 hours. Vacuum may be applied if desired to withdraw volatile by-products and to keep the resin mixture from contact with air which may cause darkening. An inert gas may also be employed to avoid contact with air.

Either unsubstituted hexanoic acid or alkyl substituted derivatives thereof may be employed. The alkyl substituents may contain from 1 to 4 carbon atoms. The preferred acid is 2-ethyl hexoic acid.

The alkylene diamines which may be employed are those of the formula

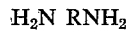

H$_2$N RNH$_2$ where R is an alkylene radical having 2 to 3 carbon atoms. Illustrative of these diamines are ethylene diamine, 1,1-diamino propane and 1,3-diamino propane. The diamines may be employed singly or in mixtures. Preferably the polyamides are prepared with the equivalents of amine groups employed being substantially equivalent to the equivalents of carboxylic groups employed. However, slight excesses, on the order of up to about 10%, of either acid or amine groups are contemplated within "substantially equivalent." It is preferable to use mixtures of the diamines. Where mixtures are employed, the ethylene diamine is generally employed in excess on an equivalent basis and preferably in the range of 80 to 95 equivalent percent based on the total equivalent of amine employed. The polymeric fat acids which may be employed in preparing the polyamides are those resulting from the polymerization of drying or semi-drying oils or the free fat acids or the simple alcohol esters of these fat acids. The term "fat acids" is intended to include saturated, ethylenically unsaturated, and acetylenically unsaturated naturally occurring and synthetic monobasic aliphatic acids containing from 8–24 carbon atoms. The term "polymeric fat acid" refers to polymerized fat acids. The term "polymeric fat radical" refers to the hydrocarbon radical of a polymerized fat acid, and is generic to the divalent, trivalent, and other polyvalent hydrocarbon radicals of dimerized fat acids, trimerized fat acids, and higher polymers of fat acids. The divalent and trivalent hydrocarbon radicals are referred to herein as "dimeric fat radical" and "trimeric fat radical," respectively.

The saturated, ethylenically unsaturated, and acetylenically unsaturated fat acids are generally polymerized by somewhat different techniques, but because of the functional similarity of the polymerization products, they all are generally referred to as "polymeric fat acids."

Saturated fat acids are difficult to polymerize but polymerization can be obtained at elevated temperatures with a peroxidic catalyst such as di-t-butyl peroxide. Because of the generally low yields of polymeric products, these materials are not currently commercially significant. Suitable saturated fat acids include branched and straight acids such as caprylic acid, pelargonic acid, capric acid, lauric acid, myristic acid, palmitic acid, isopalmitic acid, stearic acid, arachidic acid, behenic acid, and lignoceric acid.

The ethylenically unsaturated acids are much more readily polymerized. Catalytic or non-catalytic polymerization techniques can be employed. The non-catalytic polymerization generally requires a higher temperature. Suitable catalysts for the polymerization include acid or alkaline clays, di-t-butyl peroxide, boron trifluoride and other Lewis acids, anthraquinone, sulfur dioxide and the like. Suitable monomers include the branched straight chain, poly and mono ethylenically unsaturated acids such as 3-octenoic acid, 11-dodecenoic acid, linderic acid, lauroleic acid, myristoleic acid, tsuzuic acid, palmitoleic acid, petroselinic acid, oleic acid, elaidic acid, vaccenic acid, gadoleic acid, cetoleic acid, nervonic acid, linoleic acid, linolenic acid, eleostearic acid, hiragonic acid, moroctic acid, timnodonic acid, eicosatetraenoic acid, nisinic acid, scoliodonic acid, and chaulmoogric acid.

The acetylenically unsaturated fat acids can be polymerized by simply heating the acids. Polymerization of these highly reactive materials will occur in the absence of a catalyst. The acetylenically unsaturated acids occur only rarely in nature and are expensive to synthesize. Therefore, they are not currently of commercial significance. Any acetylenically unsaturated fat acid, both straight chain and branched chain, both mono-unsaturated and poly-unsaturated, are useful monomers for the preparation of the polymeric fat acids. Suitable examples of such materials include 10-undecynoic acid, tariric acid, stearolic acid, behenolic acid, and isamic acid.

Because of their ready availability and relative ease of polymerization, oleic and linoleic acid are the preferred starting materials for the preparation of the polymeric fat acids. Mixtures of these are found in tall oil fatty acids which are the general source for the polymeric fat acids of commerce prepared by polymerization of the tall oil fatty acids.

Typical compositions of commercially available polymeric fat acids based on unsaturated $C_{18}$ fat acids of tall oil fatty acids are:

$C_{18}$ monobasic acids 5–15% by weight;
$C_{36}$ dibasic acids 60–80% by weight;
$C_{54}$ (and higher) tribasic acids 10–35% by weight.

These mixtures may be fractionated by suitable means such as high vacuum distillation or solvent extraction techniques so as to obtain dimer acid cuts of higher concentration where necessary. For the purposes of the polyamides of the present invention, the monomeric fat acids content can vary over a fairly wide range, as low as 1–5% and as high as 15–20%.

The hexanoic acid is employed in an amount of from 8 to 12 equivalent percent based on the total equivalents of carboxyl groups from the polymeric fat acid and hexanoic acid.

Where highly specialized characteristics are desired, the composition of the present invention can be modified by including in the reaction mixture other components: acids such as hydroxy aliphatic acids, for example, lactic, glycolic, β-hydroxypropionic, α-hydroxy-n-caproic, β-methylpropylhydrocrylic, tetramethylhydrocrylic, β-hydroxy-α-diethylbutyric, salicylic, phenylglycolic and phenyllactic acids, aliphatic hydrocarbon acids containing from 2 to 18 carbon atoms such as acetic, propionic, butyric, octanoic, lauric, stearic, oleic, linoleic, or linolenic acids, and relatively low molecular weight aliphatic hydrocarbon dicarboxylic acids having from 4 to 10 carbon atoms, for example, azelaic, sebacic, adipic, and suberic acids. These acids serve as modifiers affecting melting point, alcohol solubility and other characteristics when some special characteristic is desired. While these modifiers may be employed when desired to modify some special characteristic, they do not materially change the overall characteristics of the polyamides of the present invention, particularly where crinkle resistance is concerned. This is particularly true if the modifying acid is not employed in excess of about 10 equivalent percent based on the total equivalents of acid employed.

Since at present most flexographic presses have natural rubber rollers which are attacked or softened by a large variety of solvents such as aromatic and aliphatic hydrocarbons, ketones and esters, the solvents employed in this invention are those which do not attack rubber. Such solvents are alcohols having the formula R″OH, where R″ is an aliphatic hydrocarbon radical having from 2 to 5 carbon atoms, such as ethanol, normal propanol, isopropanol, and butanol. Blends of these same alcohols with small amounts of other solvents such as aliphatic hydrocarbons and esters may be used where they can be tolerated, particularly if special synthetic rubber plates are to be used. Typical ink binders are employed as solutions of from about 25% to about 50% resin based on the total weight of solution. In addition, from about 0.1 to 6% water based on the total weight of solution may be present in the solvent in many cases.

As indicated, the polyamides of the present invention provide an unexpected improvement in crinkle resistance. The crinkle resistance is measured in the following manner. A flexographic ink coating is applied to the treated side of a polyethylene sheet using a hand roller from Interchemical Printing Ink Co. Before applying succeeding coats, the prior coat is allowed to dry for at least 30 minutes. Four coats are applied to the polyethylene sheet. After the final coat has dried for one day, the coated sheet is immersed in an ice and water mixture and stored at 0° C. overnight. The sheet is then removed from the ice and water mix, grasped with the thumb and index finger of both hands about a half inch apart. The fingers are rotated in a bicycle pedal manner for 10 cycles. Repeat tests are made after a short (5 seconds) reimmersion in the ice and water. The crinkle test results may then be recorded as follows:

None or slight amount of coating removed _____ 10
A moderate amount removed _____ 6
Most of the ink removed _____ 1

The invention can best be illustrated by the following examples in which the polymeric fat acids employed were obtained from the polymerization of tall oil fatty acids. The polyamides were prepared in the following manner:

*Preparation of polyamide resin*

A reaction mixture of the polymeric fat acids, hexanoic acid, and diamines are charged into a round-bottom, 3-neck flask fitted with a thermometer, mechanical stirrer, and distillation column and head. The mixture is stirred and heated to 140° C. and held at this temperature for 0.5 hour at which point the by-product water begins to distill off. The temperature is then increased to the desired raction temperature (see specific example) and held at this temperature for 4 hours, the last hour under reduced pressure. The vacuum is released and the product removed from the flask and cooled.

In the examples to follow, all parts and percentages are by equivalents unless specifically noted otherwise In testing for crinkle resistance, a flexographic ink varnish was prepared by dissolving the polyamide resin at 35% non-volatiles in isopropanol.

The following data in tabular form will illustrate the preparation of the polyamides and the evaluation of the crinkle resistance thereof:

TABLE I

| Example | 1 | 2 | 3 | 4 | 5* | 6* | 7 |
|---|---|---|---|---|---|---|---|
| Reaction Temperature, °C | 225 | 225 | 225 | 250 | 225 | 225 | 225 |
| Polymeric Fat Acid: | | | | | | | |
| Equivalents | 90 | 90 | 90 | 90 | 90 | 90 | 92 |
| Percent Monomer | 9.1 | 9.1 | 9.1 | 9.1 | | | 9.1 |
| Percent Dimer | 73.3 | 73.3 | 73.3 | 73.3 | | | 73.3 |
| Percent Trimer | 17.6 | 17.6 | 17.6 | 17.6 | | | 17.6 |
| Saponification Equivalent | 196 | 196 | 196 | 196 | 192 | 192 | 196 |
| Equivalents of 2-ethyl Hexoic Acid | 10 | 10 | 10 | 10 | 10 | 10 | |
| Equivalents of Hexanoic Acid | | | | | | | 8 |
| Equivalents of Ethylene Diamine | 85 | 84 | 90 | 90 | 90 | 90 | 90 |
| Equivalents of 1,2-diaminopropane | 15 | | | | | | |
| Equivalents of 1,3-diaminopropane | | 15 | 10 | 10 | 10 | 10 | 10 |
| Polyamide: | | | | | | | |
| Acid No | 5.3 | 7.7 | 5.7 | 3.8 | 4.5 | 5.0 | 2.9 |
| Amine No | 5.3 | 7.1 | 6.5 | 3.1 | 13.3 | 10.0 | 3.3 |
| Crinkle Resistance | 8 | 10 | 8 | 10 | 10 | 8 | 8 |

*Hydrogenated polymeric fat acids of tall oil fatty acids.

The addition of pigments and dyes to the varnishes tested above provided highly fluid inks which were stable and had excellent adhesion.

The embodiments of the present invention in which an exclusive property or privilege is claimed are defined as follows:

1. A polyamide resin consisting essentially of the condensation product of (a) a diamine of the formula $$H_2NRNH_2$$

where R is an alkylene radical having from 2 to 3 carbon atoms, (b) a polymeric fat acid and (c) a monocarboxylic acid selected from the group consisting of hexanoic acid and alkyl substituted hexanoic acid in which the alkyl group contains from 1 to 4 carbon atoms, the equivalents of amine groups employed being substantially equivalent to the equivalents of carboxyl groups employed, said monocarboxylic acid being employed in an amount of from 8 to 12 equivalent percent based on the total equivalents of said polymeric fat acid and said monocarboxylic acid.

2. A polyamide resin consisting essentially of the condensation product (a) a diamine of the formula $$H_2NRNH_2$$

where R is an alkylene radical having from 2 to 3 carbon atoms, (b) a polymeric fat acid and (c) hexanoic acid in which the equivalents of amine employed are substantially equivalent to the equivalents of carboxyl groups employed and the equivalent ratio of said polymeric fat acid to hexanoic acid is in the range of 88:12 to 92:8.

3. A polyamide resin consisting essentially of the condensation product (a) a diamine of the formula $$H_2NRNH_2$$

where R is an alkylene radical having from 2 to 3 carbon atoms, (b) a polymeric fat acid and (c) 2-ethyl hexoic acid in which the equivalents of amine employed are substantially equivalent to the equivalents of carboxyl groups employed and the equivalent ratio of said polymeric fat acid to 2-ethyl hexoic acid is in the range of 88:12 to 92:8.

4. A polyamide resin consisting essentially of the condensation product of (a) a mixture of ethylene diamine and diaminopropane in which an equivalent excess of ethylene diamine is employed, and (b) a mixture of polymerized tall oil fatty acids and 2-ethyl hexoic acid in which the equivalent ratio of polymerized tall oil fatty acids to 2-ethyl hexoic acid is in the range of 88:12 to 92:8 and the equivalents of amine employed is substantially equivalent to the equivalents of carboxyl groups employed.

5. A polyamide resin as defined in claim 4 in which the equivalents ratio of ethylene diamine to diaminopropane is in the range of 80:20 to 95:5.

6. A polyamide resin as defined in claim 4 in which the equivalents ratio of polymerized tall oil fatty acids to 2-ethyl hexoic acid is 90:10.

7. A polyamide resin as defined in claim 5 in which the equivalents ratio of polymerized tall oil fatty acids to 2-ethyl hexoic acid is 90:10.

8. A polyamide resin consisting essentially of the condensation product of (a) a mixture of ethylene diamine and diaminopropane in which an equivalent excess of ethylene diamine is employed, and (b) a mixture of polymerized tall oil fatty acids and hexanoic acid in which the equivalent ratio of polymerized tall oil fatty acids to hexanoic acid is in the range of 88:12 to 92:8 and the equivalents of amine employed is substantially equivalent to the equivalents of carboxyl groups employed.

9. A polyamide resin as defined in claim 8 in which the equivalents ratio of ethylene diamine to diaminopropane is in the range of 80:20 to 95:5.

10. A polyamide resin as defined in claim 8 in which the equivalents ratio of polymerized tall oil fatty acids to hexanoic acid is 92:8.

11. A polyamide resin as defined in claim 9 in which the equivalents ratio of polymerized tall oil fatty acids to hexanoic acid is 92:8.

References Cited

UNITED STATES PATENTS

| | | | |
|---|---|---|---|
| 2,174,527 | 10/1939 | Peterson | 260—78 |
| 2,191,556 | 2/1940 | Carothers | 260—78 |
| 2,886,543 | 5/1959 | Peerman et al. | 260—404.5 X |
| 3,224,893 | 12/1965 | Floyd et al. | 260—404.5 X |
| 3,268,461 | 8/1966 | Jacobson | 260—404.5 X |

NICHOLAS S. RIZZO, *Primary Examiner.*

F. A. MIKA, *Assistant Examiner.*